(12) United States Patent
Rogalski et al.

(10) Patent No.: US 8,843,288 B1
(45) Date of Patent: Sep. 23, 2014

(54) VEHICLE SPEED CONTROL SYSTEM AND METHOD

(71) Applicants: Zachary C Rogalski, Rochester Hills, MI (US); Ivan Roman, Commerce Township, MI (US); Loren M Trotter, Linden, MI (US); Jason Trombley, Metamora, MI (US)

(72) Inventors: Zachary C Rogalski, Rochester Hills, MI (US); Ivan Roman, Commerce Township, MI (US); Loren M Trotter, Linden, MI (US); Jason Trombley, Metamora, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/924,679

(22) Filed: Jun. 24, 2013

Related U.S. Application Data

(60) Provisional application No. 61/784,801, filed on Mar. 14, 2013.

(51) Int. Cl.
| | |
|---|---|
| *F16H 59/66* | (2006.01) |
| *B60W 10/06* | (2006.01) |
| *B60W 10/18* | (2012.01) |
| *B60W 30/14* | (2006.01) |

(52) U.S. Cl.
CPC ............. *B60W 30/143* (2013.01); *B60W 10/06* (2013.01); *B60W 10/18* (2013.01)
USPC ..................... 701/65; 701/93; 701/94; 701/70

(58) Field of Classification Search
USPC ........................................................ 701/94
See application file for complete search history.

(56) References Cited

U.S. PATENT DOCUMENTS

| | | | | |
|---|---|---|---|---|
| 4,843,553 | A | * | 6/1989 | Ohata .............................. 701/93 |
| 4,850,656 | A | * | 7/1989 | Ise et al. ......................... 303/192 |
| 4,926,328 | A | * | 5/1990 | Funatsu et al. .................. 701/56 |
| 4,931,939 | A | * | 6/1990 | Kawata et al. .................. 701/93 |
| 7,561,954 | B2 | | 7/2009 | Aizawa et al. |
| 7,774,122 | B2 | | 8/2010 | Inoue et al. |
| 7,894,971 | B2 | | 2/2011 | Inou et al. |
| 7,909,730 | B2 | | 3/2011 | Schwarz et al. |
| 8,046,145 | B2 | | 10/2011 | Ishida et al. |
| 2003/0200016 | A1 | * | 10/2003 | Spillane et al. ................. 701/36 |
| 2005/0061562 | A1 | * | 3/2005 | Mack ........................... 180/65.2 |
| 2007/0191181 | A1 | | 8/2007 | Burns |

(Continued)

FOREIGN PATENT DOCUMENTS

| | | |
|---|---|---|
| GB | 2350699 A | 12/2000 |
| JP | 7019337 A | 1/1995 |
| JP | 200490679 | 3/2004 |
| WO | 2011062697 A2 | 5/2011 |

OTHER PUBLICATIONS

International Search Report and Written Opinion dated Jul. 1, 2014, for International Application No. PCT/US2014/025591, International Filing Date Mar. 13, 2014.

*Primary Examiner* — John R Olszewski
*Assistant Examiner* — Jeffrey Boomer
(74) *Attorney, Agent, or Firm* — Ralph E. Smith

(57) ABSTRACT

A system and method of operating a vehicle at a driver selected target speed. The system and method configured to identify a target speed based on a position of a gear shift selector and control engine torque and brake pressure to control the vehicle to operate at the target speed. The system and method is further provides manipulating the engine torque and brake pressure of the vehicle in response to a driver's throttle and brake commands to operate at a speed desired by the driver.

16 Claims, 6 Drawing Sheets

(56) References Cited

U.S. PATENT DOCUMENTS

| | | |
|---|---|---|
| 2007/0244619 A1* | 10/2007 | Peterson .................. 701/70 |
| 2009/0037069 A1 | 2/2009 | Inoe et al. |
| 2009/0069993 A1 | 3/2009 | Inoe et al. |
| 2009/0076701 A1 | 3/2009 | Inoe et al. |
| 2009/0118920 A1 | 5/2009 | Heap et al. |
| 2010/0100295 A1 | 4/2010 | Inoe et al. |
| 2011/0125376 A1* | 5/2011 | Chappell et al. ................. 701/65 |
| 2012/0094803 A1* | 4/2012 | Hyodo et al. ................. 477/173 |

* cited by examiner

| SELEC-SPEED CONTROL SPEED SETTINGS (mph) | | | | | | |
|---|---|---|---|---|---|---|
| | GEAR INDICATOR | | | | | |
| GRADE % | 1ST | 2ND | 3RD | 4TH | 5TH | 6TH TO 9TH |
| 0 | 1.3 | 2.7 | 4.0 | 5.3 | 6.7 | 8.0 |
| 5 | 1.3 | 2.7 | 4.0 | 5.3 | 6.7 | 8.0 |
| 10 | 1.3 | 2.7 | 4.0 | 5.3 | 6.7 | 8.0 |
| 15 | 1.3 | 2.7 | 4.0 | 5.3 | 6.7 | 8.0 |
| 20 | 1.3 | 2.7 | 4.0 | 5.3 | 6.7 | 7.0 |
| 25 | 1.0 | 2.0 | 3.0 | 4.0 | 5.0 | 6.0 |
| 30 | 1.0 | 2.0 | 3.0 | 4.0 | 5.0 | 5.0 |
| 35 | 1.0 | 2.0 | 3.0 | 4.0 | 4.0 | 4.0 |
| 40 | 1.0 | 2.0 | 3.0 | 4.0 | 4.0 | 4.0 |
| 45 | 1.0 | 2.0 | 3.0 | 3.0 | 3.0 | 3.0 |
| 50 | 1.0 | 2.0 | 3.0 | 3.0 | 3.0 | 3.0 |
| 55 | 1.0 | 2.0 | 2.0 | 2.0 | 2.0 | 2.0 |
| 60 | 1.0 | 2.0 | 2.0 | 2.0 | 2.0 | 2.0 |
| 70 | 1.0 | 1.0 | 1.0 | 1.0 | 1.0 | 1.0 |
| 80 | 1.0 | 1.0 | 1.0 | 1.0 | 1.0 | 1.0 |
| 90 | 1.0 | 1.0 | 1.0 | 1.0 | 1.0 | 1.0 |
| 100 | 1.0 | 1.0 | 1.0 | 1.0 | 1.0 | 1.0 |

FIG. 4A

| GEAR | TARGET SPEED (KPH FOR 0% GRADE) | TARGET SPEED (KPH FOR 100% GRADE) |
|---|---|---|
| P | N/A | N/A |
| R | 1 | 1 |
| N | 2 | 1 |
| D | 1 | 1 |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |

FIG. 4B

VEHICLE SPEED CONTROL SYSTEM AND METHOD

CROSS REFERENCE TO RELATED APPLICATION

The present application claims priority to U.S. Provisional Patent Application No. 61/784,801, filed Mar. 14, 2013, the entire contents of which are incorporated herein by reference.

FIELD

The present disclosure relates to a speed control system and method for a vehicle, more particularly, to a speed control system and method for a vehicle operating at a slow or crawl speed selected by a driver.

BACKGROUND

When driving a vehicle, particularly in an off-road scenario, it is important for the vehicle's driver to be able to precisely and constantly control the vehicle's speed. This may be difficult to do in some operating circumstances. For example, in an off-road context, additional engine torque is required as the vehicle is often climbing a rock or other obstacle. However, immediately after the vehicle summits the obstacle, substantially less torque is required to maintain an approximately constant vehicle speed. In fact, an increase of brake pressure may be required to maintain a constant speed when descending the obstacle. This transition from increased torque to reduced torque and braking can happen very rapidly, making it difficult for the driver to maintain an approximately constant speed. Manual transmission vehicles typically combat this problem by employing low gears that enable the vehicle to climb the obstacle with little or no throttle application by the driver. Likewise, inherent engine braking in a low gear ratio manual transmission means that little to no conventional brake application is necessary to maintain the constant speed when descending the obstacle.

A typical automatic transmission, however, does not have as low a gear ratio as a typical manual transmission. Thus, both throttle and braking by the driver are necessary to maintain an approximately constant speed when driving over obstacles. Some prior art automatic transmissions have accomplished this type of control with the use of a driver operated dial that allows the driver to select from several preset speeds at which the vehicle may be instructed to travel. The vehicle's electronic control unit typically manipulates engine torque and braking to cause the vehicle to move at one of the preset speeds. However, in these designs, the driver is unable to control the speed of the vehicle using the throttle and brake pedal. Instead, the vehicle must travel at one of the preset speeds.

What is needed, therefore, is a method of operating a vehicle transmission to smoothly and accurately control vehicle speed during off-road driving. What is further needed is a method of manipulating the engine torque and brake pressure of a vehicle in response to driver throttle and brake commands to allow driver override if the driver wishes to increase or decrease the vehicle speed during operation.

SUMMARY

In one form, the present disclosure provides a system and method of operating a vehicle having an automatic transmission including determining a target speed and operating the vehicle at the target speed, detecting a throttle or brake input from a driver wherein the throttle or brake input establishes a driver input speed. The method also includes operating the vehicle at the driver input speed until the driver terminates the throttle or brake input, and operating the vehicle at the target speed once the throttle or brake input is terminated.

In another form, the present disclosure provides a system and method of operating a vehicle including activating the speed control system and method upon a driver request if enable conditions are satisfied, and determining a target speed corresponding to a driver selected speed and incline of the vehicle and operating the vehicle at the determined target speed. The system and method also includes detecting a throttle or brake input from the driver wherein the throttle or brake input establishes a driver input speed, and operating the vehicle at the driver input speed until the driver terminates the throttle or brake input. The system and method further includes operating the vehicle at the target speed once the throttle or brake input is terminated, and deactivating the method upon a request by the driver if disable conditions are satisfied.

Thus, a system and method of operating an automatic transmission that controls the driving experience in an off-road setting is provided. The system and method controls the engine torque and brakes of a vehicle in response to a driver's throttle and brake commands to maintain an approximately constant speed desired by the vehicle operator.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 4A is an exemplary table listing target speeds of the selec-speed control system for an exemplary transmission in a vehicle operated on a variety of grades;

FIG. 4B is another exemplary table listing target speeds of the speed control system.

DETAILED DESCRIPTION

Before describing the disclosed embodiments of the technology in detail, it is to be understood that the technology is not limited in its application to the details of the particular arrangement shown herein since the technology is capable of other embodiments. Also, the terminology used herein is for the purpose of description and not of limitation.

The system and method described herein provides for selec-speed control ("SSC"). SSC is a feature of an electronic brake control system that allows a vehicle to travel at a slow speed (i.e., a crawl speed) selected by the driver. The system controls the vehicle speed on level ground, uphill or downhill. The selec-speed control system ("SSC system") is provided to enable a vehicle to travel over rough off-road terrain without driver input for throttle or brakes. To control vehicle speed, SSC can apply the vehicle brakes and request torque, above driver request, from the engine controller. SSC function is to be very smooth, acceleration or deceleration is, in most cases, to be very slow.

Figure 1:
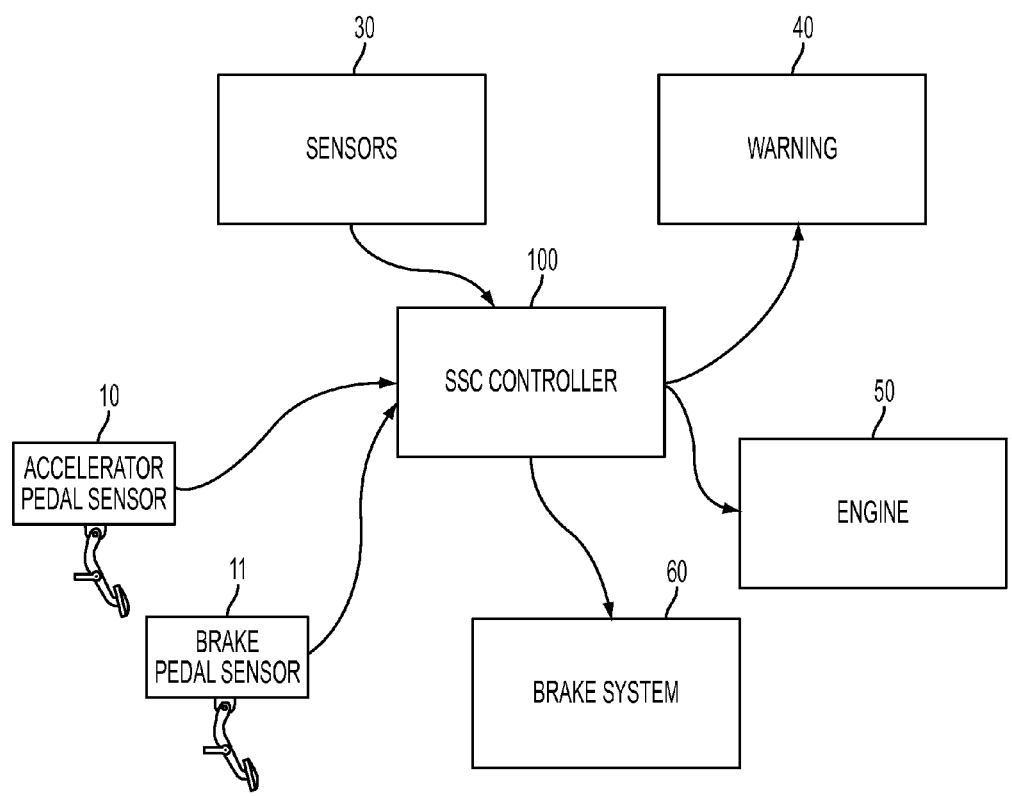
FIG. 1 is a block diagram depicting components of the selec-speed control system according to an embodiment disclosed herein.

FIG. 1 illustrates a block diagram depicting the vehicle components for implementing the SSC system in accordance with an exemplary embodiment of the present disclosure. The SSC system includes a SSC controller 100. The SSC controller includes a non-volatile memory that stores the instructions for carrying out the control process of the SSC system and a processor configured to execute the instructions accordingly. As will be discussed in more detail below, the SSC controller 100 receives a driver selected target speed based on input received from the user-selected gear position of the gear shift selector.

During SSC control, the SSC controller 100 receives data from an accelerator pedal sensor 10 and a brake pedal sensor 11, which serves as a user override as will be discussed in more detail below. The SSC controller 100 also receives data from one or more additional sensors 30. The additional sensors 30 may include, but are not limited to, a vehicle inclination sensor (grade), one or more speed sensors, a transmission state sensor, and an SSC switch. The SSC controller 100 is also in communication with an engine 50 and brake system 60 of the vehicle in which the SSC controller 100 is located. Essentially, the SSC controller 100 comprises two separate and concurrent running controllers to modulate brake pressure and engine torque separately to maintain the driver selected target speed. Furthermore, in one embodiment the SSC controller 100 can be in further communication with a warning system 40 that communicates a visual, audible or physical warning to the driver when an error has occurred in the SSC system.

Figure 2:
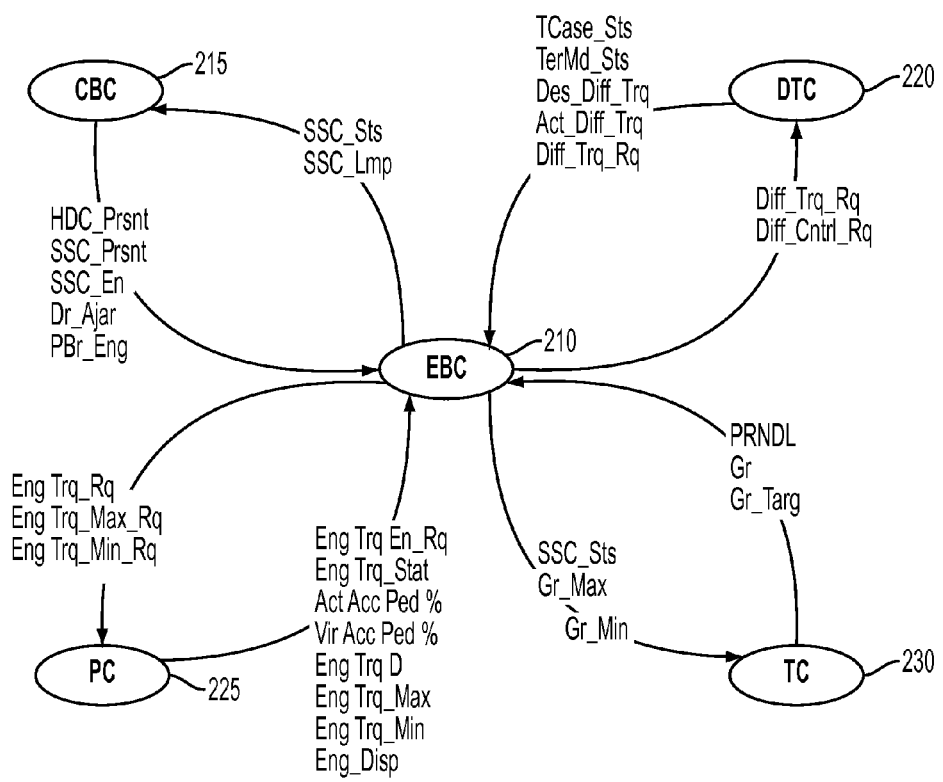
FIG. 2 illustrates a block diagram depicting the functional components for the SSC system in accordance with an exemplary embodiment of the present disclosure.

FIG. 2 illustrates a block diagram depicting the functional components for the SSC system in accordance with an exemplary embodiment of the present disclosure. In the exemplary embodiment, the SSC controller 100 is comprised in an electronic brake control module ("EBC module") 210. As shown, the EBC module 210, which includes the SSC controller 100 of FIG. 1, is communicatively coupled with four slave modules: (1) a central body control module ("CBC module") 215, (2) a drivetrain control module ("DTC module") 220, (3) a powertrain control module ("PC module") 225, and (4) a transmission control module ("TC module") 230. As shown, the EBC module 210 is configured to output signals to and receive signals from each of the four modules. More particularly, it is contemplated that the EBC module 210 serves as the driver of the SSC system and is configured to output control signals to the CBC module 215, DTC module 220, the PC module 225, and the TC module 230 to modulate engine torque, transmission gear, lamp handling, and the front, center and/or rear differential to maintain the vehicle at the driver selected target speed in a smooth manner while optimizing performance based on the driver selected terrain. It should also be appreciated that in alternative embodiments, additional or fewer of these respective modules can be used to implement the SSC system and/or the respective functionalities of these systems could be combined in one or more of the various modules.

In the exemplary embodiment, the EBC module 210 is configured to transmit a selec-speed status signal ("SSC_Sts") to both the CBC module 215 and the TC module 230 that indicates whether the SSC system is "OFF" (e.g., indicated by a "0") or "ON" (e.g., indicated by a "1") or "INHIBIT" for manual override (e.g., indicated by a "2"). The EBC module 210 also transmits a selec-speed lamp signal ("SSC_Lmp") to the CBC module 215 as instructions to indicate whether the selec-speed lamp on the instrument cluster and the selec-speed switch is "ON" or "OFF" or unavailable or the like.

The EBC module 210 is further configured to transmit a signal indicating an upper gear limit ("Gr_Max") to the TC module 230 when the vehicle is operating in SSC operation. The upper gear limit is provided to control proper engine braking and aid in maintaining speed during SSC operation. Preferably, the upper gear limit is predetermined by the system design to control the proper engine braking and aid in maintaining proper vehicle speed during SSC operation. Accordingly, the transmission must honor the upper gear limit request during SSC operation. In the exemplary embodiment, the upper gear limit signal ("Gr_Max") is in a passive state when SSC is not enabled, SSC is enabled but the vehicle is not in a forward driven gear, SSC is enable but the system is in driver override (discussed below), and following driver throttle override and while the vehicle is above the speed threshold defined by SSC operation. Further, during normal SSC operation (i.e., engine control without driver override) or following driver override and the vehicle is below the speed threshold, the upper gear limit will be first gear in the exemplary embodiment. Further, if the vehicle is traveling at a slope less than threshold for activation of the SSC engine controller component, the upper gear limit will be second gear in the exemplary embodiment. In addition, in one embodiment, the EBC module 210 is also configured to transmit a signal indicating a lower gear limit ("Gr_Min") to the TC module 230 when the vehicle is operating in SSC operation.

Furthermore, the CBC module 215 is configured to provide status signals to the EBC module 210, which include whether the vehicle has Hill Descent Control ("HDC") functionality ("HDC_Prsnt"), whether the vehicle supports an SSC system ("SSC_Prsnt"), whether the driver has enabled the SSC system ("SSC_En"), whether any of the doors are ajar ("Dr_Ajar"), and whether the parking brake is engaged ("PBr_Eng"). As should be appreciated to one skilled in the art, the EBC module 210 interprets each of these signals received from the CBC module 215 when generating its instruction signals for the various modules to operate the SSC system. In one embodiment, the CBC module 215 is further configured to provide a signal to the EBC module 210 indicating whether forward, center and/or rear differential on the vehicle is present an active (signal not shown in FIG. 2). It is contemplated for certain vehicles, the signal serves as a robustness check since the SSC system cannot function on such vehicles without at least a functional rear differential that is active and present.

Furthermore, during SSC operation, the TC module 230 is a slave to the EBC module 210 in order to maintain the proper gearing to optimize the off road performance and smoothness of the SSC controller. The TC module 230 is configured to provide a signal to the EBC module 210 indicating the PRNDL position ("PRNDL"), which in turn can be provided to the driver on the instrument cluster. Furthermore, the TC module 230 generates signals indicating the current gear ("Gr") and target gear ("Gr_Targ") of the transmission.

As discussed above the EBC module 210 is also communicatively coupled to the PC module 225. Generally speaking, the PC module 225 is the electronics system for controlling the powertrain of the vehicle, i.e., the group of components that generate power and deliver it to the road surface, water, or air, including the engine, transmission, drive shafts, differentials, final drive and the like. In the exemplary embodiment, the EBC module 210 provides an engine torque request signal ("EngTrq_Rq") or brake torque request signal (not shown or, alternatively, with "EngTrq_Rq" signal) to the PC module 225 to request engine torque/brake torque to keep the vehicle traveling at the driver set target speed as discussed above. In one embodiment, the EBC module 210 does not output engine torque requests if the vehicle is traveling down a slope steeper than a threshold. This is because the gravity and idle torque forces are sufficient for the vehicle to maintain the target speed. In a refinement of this embodiment, the EBC module 210 provides an engine torque maximum request signal ("EngTrq_Max_Rq") and an engine torque minimum request signal ("EngTrq_Min_Rq") to the PC module 225, which serve as control/override signals to correctly control when the engine torque request ("EngTrq_Rq") should be honored by the system.

When additional engine/brake torque is not required, the EBC module 210 will provide a static signal (not shown) to the PC module 225. In turn, the PC module 225 is configured to output a signal ("EngTrq_Stat") to the EBC module 210 indicating the instantaneous torque output by the engine. The PC module 225 also transmits a signal (quantified by a percentage) ("ActAccPed %") of the position of the pedal. In one embodiment, a brake pedal is directly wired to the EBC module 210 or, alternatively, the brake switch is wired to the PC module 225. In either case, when the user presses the accelerator or brake pedal for additional torque during selec-speed operation, a signal ("ActAccPed %") is transmitted to the EBC module 210 indicating the position of the accelerator and/or brake pedal. In one refinement, the PC module 225 transmits a signal (quantified by a percentage) ("VirAccPed %") of the virtual position of the pedal. The EBC module 210 then processes this signal to generate a corresponding torque request signal back to the PC module 225, which causes the engine to generate appropriate torque or, alternatively, modulate brake pressure to effectuate the driver's override request. It should be appreciated that during driver override in the exemplary embodiment, the EBC module 210 should not continue sending additional torque request above that requested by the driver based on the position of the accelerator and/or brake pedal.

In an additional embodiment, the PC module 225 is configured to transmit signals to the EBC module 210 including a driver engine torque signal ("EngTrqD") that outputs the driver demanded propulsion torque, an engine torque enable request ("EngTrqEn_Rq"), engine torque maximum ("EngTrq_Max") and engine torque minimum ("EngTrq_Min") signals, and an engine displacement ("Eng_Disp") signal. It should be appreciated to one skilled in the art that these signals are interpreted by the EBC module 210 during SSC operation when generating its control signals.

Finally, the EBC module 210 is configured to transmit a front, center and/or rear differential coupling request to the DTC module 220. In one embodiment, during SSC control, the front, center and/or rear differential is desired to be coupled as a function of steering, inclination, and terrain select mode. The value should therefore be calibrated to optimize performance during selec-speed control. The signals transmitted from the EBC module 210 to the DTC module 220 can include a differential torque request signal ("Diff_Trq_Rq"), which is a torque request across front, center and/or rear differentials, and can also include a differential control request ("Diff_Cntrl_Rq"), which serves as a control signal to dictate how the DTC module 220 should respond to the differential torque request signal ("Diff_Trq_Rq"). For example, in some configurations, it may not be necessary for the DTC module to respond to a differential torque request signal ("Diff_Trq_Rq").

The DTC module 220 is also configured to transmit multiple signals to the EBC module 210. First, the DTC module 220 outputs the status of the transfer case ("TCase_Sts") and communicates whether the drivetrain is in the 4Low state, as required for SSC control. Second, the DTC module 220 is configured to transmit a terrain mode status signal ("Ter-Md_Sts") to specify the terrain mode for the SSC system, as will be discussed in more detail below. Third, in the exemplary embodiment, the DTC module 220 and the EBC module 210 communicate as a feedback loop. In other words, the DTC module 220 is configured to transmit a desired differential torque signal ("Des_Diff_Trq") and an actual differential torque signal ("Act_Diff_Trq"). This signals can be for any one or all three of the front, center and/or rear differentials. In response to these signals, the EBC module 210 can transmit further differential torque request signals ("Diff_Trq_Rq") to adjust the differential torque accordingly, as would be skilled to one skilled in the art.

Finally, as noted above the CBC module 215 is configured to output whether the front, center and/or rear differential is present on the vehicle and active. However, in an alternative embodiment, the DTC module 220 is configured to transmit this signal to the EBC module 210.

It should be understood that the four slave modules 215-230 communicate with and are controlled by the EBC module 210 of selec-speed control using, inter alia, the data signals/communication discussed above. However, it is reiterated that different vehicles may have varying configurations of these modules. For example, the functionality of any of the four slave modules 215-230 can be combined to one or more modules, or, alternatively, be divided into separate modules.

Figure 3:
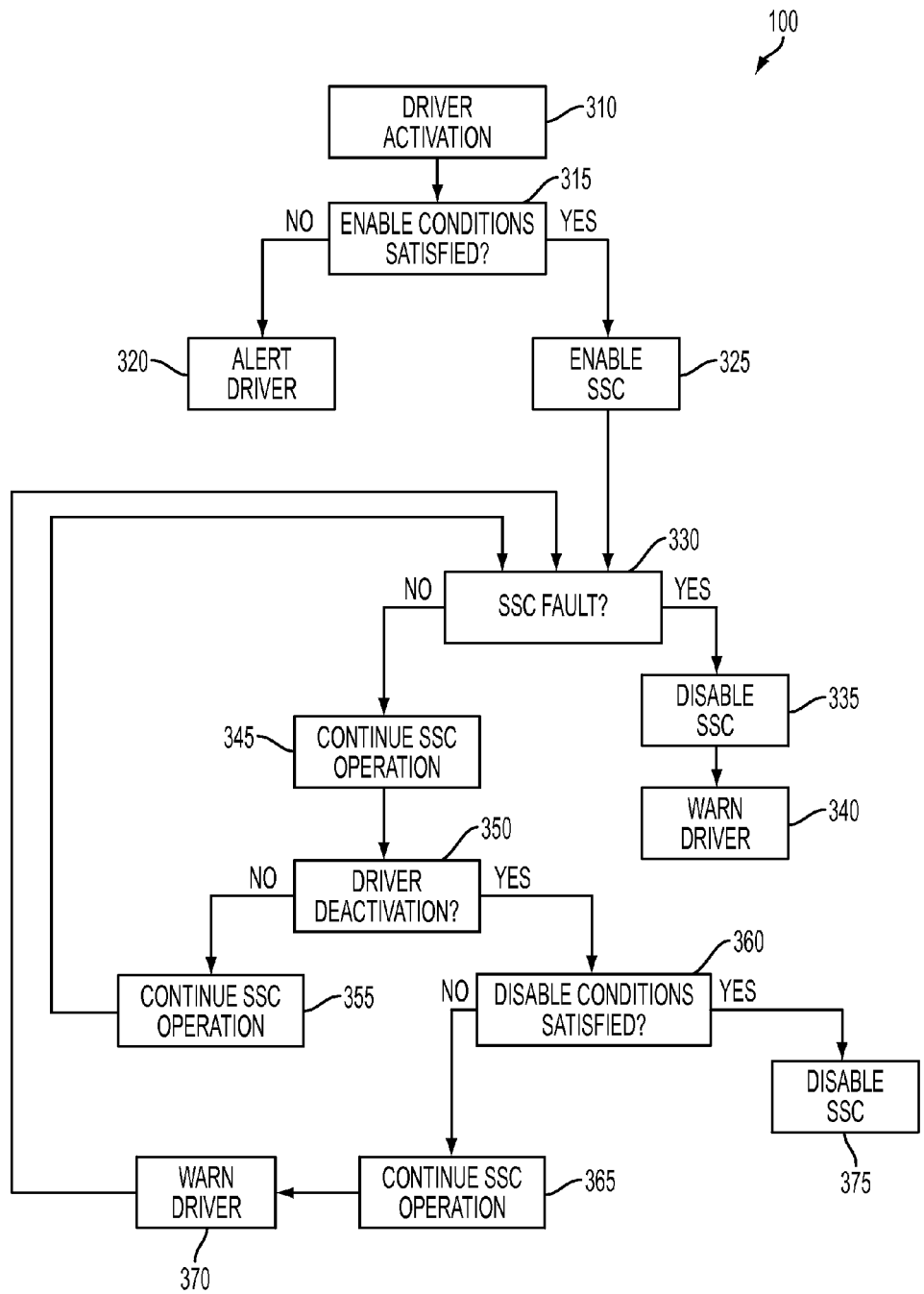
FIG. 3 is a flowchart depicting the activation and deactivation of the selec-speed control system according to an embodiment disclosed herein.

FIG. 3 is an example flowchart 100 depicting the activation and deactivation of the selec-speed control system in accordance with the present disclosure. Initially, the SSC system is activated by a driver operable switch at Step 105. Once the driver presses the SSC switch (Step 310), the SSC controller 100 determines whether the enable conditions required to allow the SSC system to be activated are satisfied (Step 315). The enable conditions can include, but are not limited to, detecting that no existing faults that prevent normal operation of the vehicle's electronic stability control system ("ESC"), the transfer case is in its low range operating configuration, the driver is applying the brakes, the driver is not applying the throttle, the park brake is not applied, the vehicle is not moving, and the SSC switch has been pressed for a predetermined amount of time (in one embodiment 5 seconds). In one embodiment, the enable conditions are one or several of those listed above, but necessarily all conditions are required. For example, it is contemplated that in one embodiment, SSC operation can be enabled while the vehicle is moving. Furthermore, other enable conditions may be utilized independently or in combination with those above. In one embodiment, the SSC system may be activated if the transfer case is in a four wheel high range. In the event the enable conditions are satisfied (Step 315), the SSC system is enabled (Step 325). In the event the enable conditions are not satisfied (Step 315), the SSC system is not enabled and a visual, audible or physical warning is sent to the driver (Step 320).

In one embodiment, the SSC system is disabled if a fault is detected (Step 330). Thus, the SSC system checks to determine whether an SSC fault has occurred (Step 330). SSC faults include, but are not limited to, a fault in the ESC system or a vehicle speed over a predetermined speed (e.g., 20 mph).

In one embodiment, the faults include one or several of those listed above, however, other faults may exist. In the event no faults exist (Step 330), the method continues SSC operation (Step 345). In the event a fault exists (Step 330), the SSC system is disabled (Step 335) and a warning is sent to the driver (Step 340).

To manually exit SSC operation, the driver presses the SSC switch (Step 350). In the event the driver does not press the SSC switch (Step 350), the SSC system continues operation (Step 355) and returns to the step of checking for SSC system faults (Step 330). Once the driver presses the SSC switch to deactivate the SSC (Step 350), the SSC system determines whether the disable conditions required to allow the SSC system to be deactivated are satisfied (Step 360). The disable conditions include, but are not limited to, detecting that the driver is applying the brakes, the vehicle is not moving, and/or the SSC switch has been pressed for a predetermined amount of time (in one embodiment 5 seconds). In one embodiment, the SSC may be disabled if the vehicle is moving at any speed and the SSC switch has been pressed for a predetermined amount of time (in one embodiment 5 seconds). In one embodiment, the disable conditions include one or several of those listed above, however, additional disable conditions may exist. In the event the disable conditions are satisfied (Step 360), the SSC system is disabled (Step 375). In the event the disable conditions are not satisfied (Step 360), the SSC system continues operation (Step 365), a warning is sent to the driver (Step 370), and the SSC system then returns to the step of checking for SSC system faults (Step 330).

In operation, the SSC system attempts to achieve a target speed defined by the driver. Specifically, using the gear shift selector, the driver can set the target speed by moving the gear shift to a desired position (e.g., P, R, N, D, L, or any numerical value indicated thereon). Once the target speed is defined by the user based on the gear shift position, during SSC control, the SSC system manipulates the torque produced by the vehicle's engine 50 and the brake pressure produced by the vehicle's brake system 60. As will be discussed in more detail below with respect to FIGS. 4A and 4B, the exemplary SSC system features a target speed for each gear ratio provided in the automatic transmission and the target speeds are stored in the SSC controller 100. Furthermore, the target speed for each gear ratio is set for operation on level ground, but the SSC system is further configured to adjust the gear ratio based on the grade the vehicle is traveling on. In the exemplary embodiment, the target speed will be adjusted downward whenever the vehicle is on a graded slope traveling downhill. The downward adjustment is a factor of the steepness of the graded slope.

It should be understood that in order to adjust the target speed during SSC control, the user can adjust the gear shift selector, which controls the target speed. In one refinement of the inventive system, the driver can also adjust the target speed by manipulating the "+" and "−" buttons of the cruise control mechanism. It should also be appreciated that while the target speed corresponds to the user selected gear position of the gear shift selector, the transmission is not necessarily in the same gear as the user selected gear position. For example, even if the gear shift selector is in 3rd gear, the transmission may be in 1st, 2nd or 3rd based on the engine torque requirements necessary to ensure the vehicle is traveling at the target speed. In other words, the gear shift selector serves as designation for the maximum or highest gear during SSC control, but the SSC controller 100 controls the gear ratio independently of the gear designated by the gear shift selector.

FIG. 4A is an exemplary table listing target speeds of the SSC system for an exemplary transmission in a vehicle operated on a variety of grades. The target speeds of FIG. 4A are for exemplary purposes only, however, it should be appreciated that the target speed will increase as the indicated gear increases. As shown, the target speed for 1st gear is 1.3 mph, the target speed for 2nd gear is 2.7 mph, and so forth. In other words, once the user instructs the vehicle to operate in SSC, the user can position the gear shift selector to designate the specific target speed for SSC operation. When the vehicle is traveling on level ground or uphill (or only slightly downhill), the SSC controller 100 will request engine torque as necessary (as described in detail above) to ensure the vehicle travels at the corresponding target speed. If the vehicle is traveling downhill, sensors 30 will provide a signal indicative of the grade (see the left column of FIG. 4A) and the SSC controller 100 will determine the corresponding target speed based on both the position of the gear shift selector and the grade. For example, when the gear shift selector is in third gear and the vehicle is traveling at a 30% downhill grade, the target speed is 3.0 mph. Accordingly, the SSC controller 100 will output signals accordingly to the braking system to manipulate brake pressure to maintain the target speed. It is reiterated that the actual speed values shown in FIG. 4A are for illustrative purposes only and that the invention is in no way intended to be limited by these speed values. Further, as shown in FIG. 4A, the grade % is in five percent increments. Accordingly, in the exemplary embodiment, it is contemplated that if the actual vehicle incline is between two grades, the SSC controller 100 will round up or down accordingly. It should be understood, however, grade percentages should not be limited to five percent increments and that in an alternative embodiment, a target speed could be provided in one percent increments, etc.

As discussed in detail above, once the target speed is determined by the SSC controller 100, to maintain the target speed, the SSC system selectively requests engine torque from the vehicle's engine or increases brake pressure of the vehicle's brakes. In one embodiment, the SSC system may request torque from the vehicle's engine when travelling down a grade of 3% or more. In one embodiment, the SSC system may request a maximum of 160 Nm of torque ("SSC torque limit") from the vehicle's engine. Furthermore, the SSC system can request a maximum of more or less than 160 Nm of torque from the vehicle's engine. In one embodiment, the maximum torque requested by the SSC system from the engine requested may vary in accordance with the grade on which the vehicle is travelling. For example, the maximum permissible torque may increase in relation to an increase in the grade upon which the vehicle is travelling. In one embodiment, the maximum permissible torque decreases in relation to an increase in a grade that the vehicle is travelling. In one embodiment, the SSC system may request maximum torque for a constant duration of less than 10 seconds, when the vehicle is moving, and less than 10 seconds when the vehicle is stationary. In one embodiment, the SSC system may only request maximum torque for a constant duration of more or less than 10 seconds when the vehicle is moving and more or less than 10 seconds when the vehicle is stationary. In one embodiment, the maximum permissible torque is higher when the vehicle is operated a low range mode than in a four wheel high mode. While FIG. 4A establishes a target speed for each gear position and grade, the driver may override the target speed using the vehicle's accelerator and/or brake.

It is reiterated that FIG. 4A provides one exemplary design implementation for the SSC control system and method described herein. It is contemplated that the settings illustrated in FIG. 4A are set during manufacture of the SSC control system and/or set by modifying/updating the software for the system accordingly. The control speed settings of FIG. 4A are provided for exemplary purposes.

FIG. 4B illustrates an alternative exemplary table listing target speeds of the SSC system. In this embodiment, the ratio between gear and target speed for a 0% grade is on a linear scale. For example, the target speed for 1st gear is 1 kph, the target speed for 2nd gear is 2 kph, the target speed for 3rd gear is 3 kph, and so forth. As further shown in FIG. 5, the target speed of the vehicle will be adjusted based on grade. As shown, the right column illustrates the target speed at 100% to be 1 kph for all gears, although it should be appreciated that the exemplary 100% grade if theoretical and simply shown to illustrate that the target speed will decrease between 0% and 100% grade (except for "reverse", "neutral" and "drive" gears that always operated at 1 kph in this embodiment). In one embodiment, the SSC system is configured to interpolate interim speeds when the grade is changing and can consider hysteresis to avoid highly dynamic speed targets.

Figure 5:
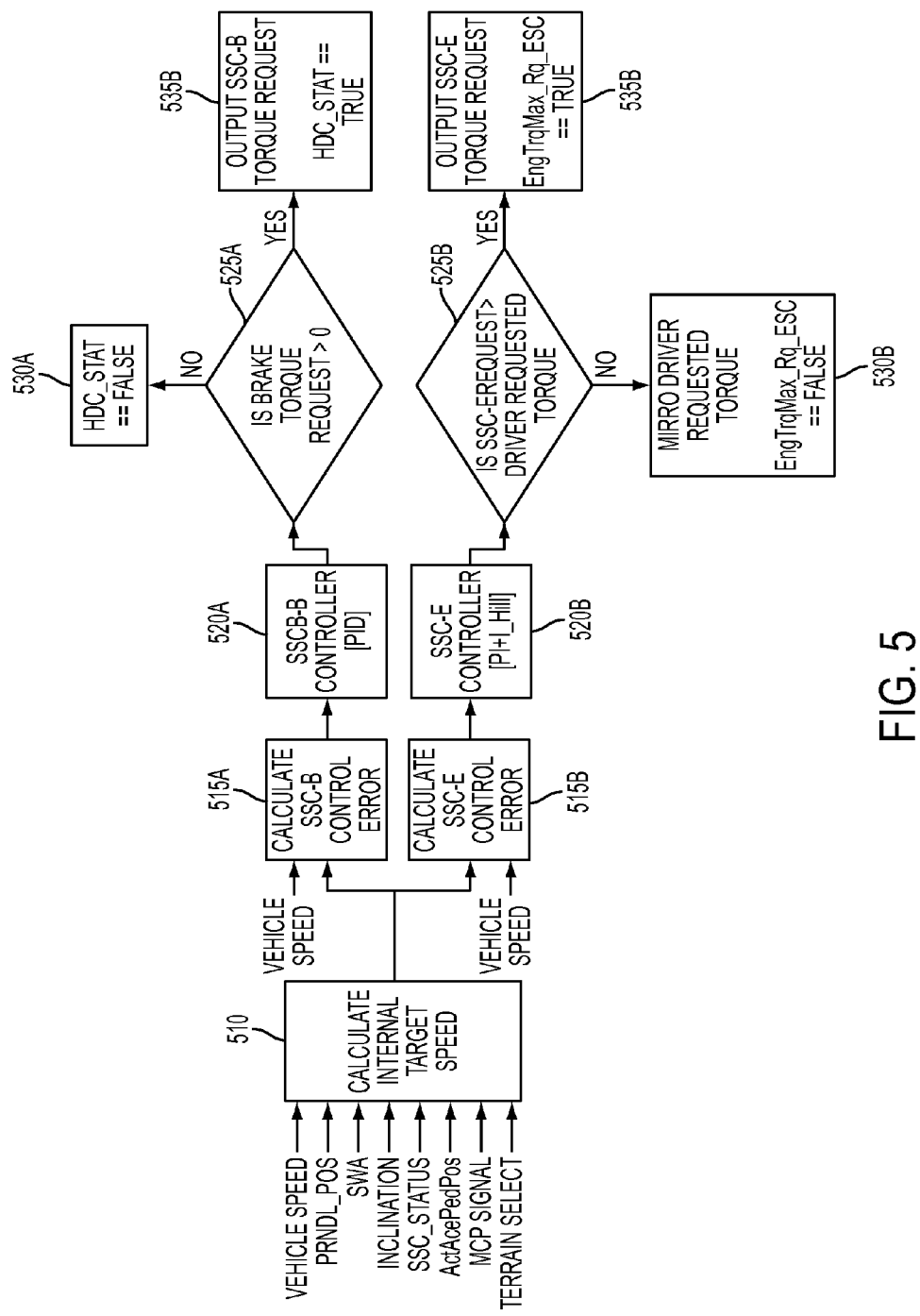
FIG. 5 illustrates an exemplary flowchart of SSC system operation during driver override in accordance with an exemplary embodiment of the present invention.

FIG. 5 illustrates an exemplary flowchart of SSC system operation during driver override in accordance with an exemplary embodiment of the present invention. Initially, at Step 510 the SSC controller 100 calculates a target speed based on the position of the gear shift selector and the grade of ground being traversed by the vehicle, as discussed in detail above. Next, at Steps 515A and 515B, the SSC controller 100 calculates control errors for the SSC brake controller component and SSC engine controller component of the SSC controller 100. At Step 520A and 520B, the SSC controller 100 then applies any necessary brake torque requests (Step 520A) and torque requests (Step 520B) to ensure the vehicle is operating at the target speed. It should be understood that these request take into account error values, if any, calculated at Steps 515A and 515B, respectively.

Steps 525A and 525B are illustrative of driver override. Specifically, if the driver depresses the accelerator and/or brake pedal, the PC module 225 transmits a signal (quantified by a percentage) of the position of the respective pedals to the EBC module 210. The EBC module 210 (i.e., the SSC controller 100) performs a comparison at each of Steps 525A and 525B to determine whether an override is required.

At Step 525A, if the brake request is greater than "0", the SSC controller 100 will generate a brake torque request because the system has determined that the driver wishes to go slower than the operating target speed (Step 530A). If the brake request is "0" then the SSC controller 100 will take no further action regarding brake torque request at that time (Step 535A). It should be appreciated that in an alternative embodiment, the comparison value "0" can be some other value greater than 0.

Similar, at Step 525B, the SSC controller 100 will compare the driver requested torque with the current value of engine torque being requested by the SSC system to maintain the target speed. If the SSC engine torque is greater than the driver torque request, the SSC controller 100 will continue to output the SSC engine torque request (Step 535B). However, if the driver torque request is greater than the engine torque request, the SSC controller 100 will generate an additional torque request to mirror the driver's request (Step 530B).

It should be appreciated that in the exemplary embodiment, the two parallel legs of the process illustrated in FIG. 5 (for brake torque and engine torque) are being performed concurrently. However, in an alternative embodiment, these checks can be performed in sequence or the like. Furthermore, it should be appreciated that this process is being performed continuously and that the brake torque request and engine torque requests are constantly being adjusted to ensure that the vehicle is traveling at a smooth and consistent speed (except when driver override dictates that the vehicle travels faster or slower than the target speed.

Further, it is noted that in the exemplary embodiment, during acceleration or deceleration due to driver override, the SSC system is not turned off or disabled. Rather, the SSC system maintains the driver input speed based on the accelerator or brake pedal position instead of the target speed. When the accelerator is depressed and the torque requested by the driver is less than the SSC torque limit (160 Nm in the example above), the SSC torque limit will remain in effect even though the driver has depressed the accelerator. However, if the torque requested by the driver exceeds the SSC torque limit, the SSC system will permit the engine to produce the torque requested by the driver for the duration of the driver's command. Once the driver releases the accelerator, the SSC system will gradually return to the target speed of FIG. 3 in a smooth manner. In one embodiment, this operation depends on the vehicle speed. Thus, it is contemplated that the SSC system will not reduce from a high rate a speed, rather, once the driver gets below a configurable parameter speed the SSC system will become active and begin controlling the PC module 225, the TC module 230 and brakes to operate at the target speed.

As stated above, the driver may also depress the brake pedal and, thereby, cause the vehicle to move slower than the target speeds of FIG. 4A or 4B. This new speed becomes the driver input speed and is maintained by the SSC system. Again, it is noted that during this braking, the SSC system is not turned off or disabled, even if the vehicle is brought to a complete stop. Once the driver releases the brake pedal, the SSC system will gradually return to the target speed of FIG. 4A or FIG. 4B in a smooth manner.

The SSC system smoothly transitions from the target speed to the driver input speed and, conversely, from the driver input speed to the target speed. In one embodiment, the rate at which the SSC system transitions from the target speed to the driver input speed or vice versa is dependent upon the difference in the engine torque or braking force called for by the target speed and the driver input speed. In one embodiment, the grade upon which the vehicle is operating may also be taken into account.

The gear in which the transmission is operated is determined by the SSC system. In one embodiment, the default gear in which the transmission is operated is first gear (i.e., the lowest gear ratio in the automatic transmission). In one embodiment, the transmission is shifted out of first gear and into decreasing gear ratios (i.e., second gear, third gear, etc.) when a higher target speed is selected by the driver of the vehicle. For example, a higher gear may be selected at higher vehicle speeds. In one embodiment, other factors such as the grade upon which the vehicle is travelling may be taken into account when selecting the gear that the transmission is operated in. In one embodiment, the SSC system changes through gear ratios sequentially and, for example, does not jump from the lowest gear ratio directly to the third lowest gear ratio. In one embodiment, the SSC system allows a driver to operate the vehicle while applying both the accelerator and the brakes at the same time.

Thus, a method of operating an automatic transmission that simulates the driving experience of a manual transmission in an off-road setting is provided. The method manipulates the engine torque and brakes of the vehicle in response to driver throttle and brake commands to maintain an approximately constant speed desired by the driver.

In addition, for the SSC system and method discussed above, it is contemplated that in one embodiment, the vehicle can be provided with a Select Terrain dial/switch in which the vehicle is configured to customize/tailor the SSC operation according to the driving terrain (e.g., rock, mud, sand, snow, etc.). In one embodiment, the device is configured to identify the driving terrain according to appropriate sensors as would be understood to one skilled in the art and provided by the DTC module discussed above as a terrain mode status signal ("TerMd_Sts"). Alternatively, the SSC system includes a driver operable dial/switch that enables the driver to select the driving condition/terrain.

In the exemplary embodiments, based on the selected terrain of the Select Terrain switch, the SSC system operates according to the following calibrations/modifications: (1) "rock" mode—slower engine builds, more active braking, emulate two foot driver operation, possible grade dependent engine builds, differential (e-Locker or ELSD) more aggressively coupled; (2) "auto" mode—control is geared more toward driver comfort and smoothness, no two foot driving emulation (less brake interventions), less aggressive ELSD coupling; (3) "mud" mode—similar characteristics to the "auto" terrain mode, but this mode controls the engine to build faster to dig into the surface better; (4) "sand" mode—similar characteristics to the "auto" terrain mode, but this mode controls the engine to build faster to dig into the surface better; and (5) "snow" mode—similar characteristics to the "auto" terrain mode. It should be appreciated that these modes and respective calibrations are provided as examples to indicate that the SSC system can be configured to operate according to driving terrain and condition. To achieve the appropriate response according to the selected terrain mode, the SSC controller 100 while operate the SSC engine controller component as discussed above and as would be understood to one skilled in the art.

What is claimed is:

1. A system of controlling a vehicle speed of a vehicle with an engine, the system comprising:
   a gear shift selector operable by a user of the vehicle to be set in one of a plurality of forward gear levels;
   a sensor configured to measure an incline grade of the vehicle;
   an electronic memory configured to store a plurality of vehicle target speeds that each correspond to both one of the plurality of forward gear levels of the gear shift selector and one of the plurality of incline grades of the vehicle; and,
   a controller communicatively coupled to the electronic memory and the sensor, the controller configured to:
   receive a signal from the gear shift selector indicating a set forward gear level of the plurality of forward gear levels,
   receive a signal from the sensor indicating the incline grade of the vehicle,
   identify a requested vehicle target speed of the plurality of target speeds that corresponds to the set forward gear level of the gear shift selector and the incline grade of the vehicle, and
   generate at least one of an engine torque request and a brake torque request to control the vehicle speed to equal the requested vehicle target speed,
   wherein the controller identifies the requested vehicle target speed independent of any operating conditions of the engine.

2. The system of controlling vehicle speed according to claim 1, wherein the controller is further configured to output a signal corresponding to the engine torque request to the engine of the vehicle to increase torque provided by the engine to increase the vehicle speed.

3. The system of controlling vehicle speed according to claim 1, wherein the controller is further configured to output a signal corresponding to the brake torque request to a braking system of the vehicle to increase brake pressure provided by the braking system to decrease the vehicle speed.

4. The system of controlling vehicle speed according to claim 1, wherein the controller is further configured to receive a signal indicative of a relative position of at least one of an accelerator pedal and a brake pedal of the vehicle.

5. The system of controlling vehicle speed according to claim 4, wherein the controller is further configured to generate a second engine torque request based on the relative position of the accelerator pedal.

6. The system of controlling vehicle speed according to claim 4, wherein the controller is further configured to generate a second brake torque request based on the relative position of the brake pedal.

7. The system of controlling vehicle speed according to claim 1, wherein at least one of the plurality of vehicle target speeds is adjusted downward in direct relation to the incline grade upon which the vehicle is travelling.

8. The system of controlling vehicle speed according to claim 1, wherein the controller is further configured to stop generating the at least one of the engine torque request and the brake torque request if a fault is detected.

9. A method of controlling vehicle speed of a vehicle with an engine, the method comprising:
   storing, in an electronic memory, a plurality of vehicle target speeds that each correspond to one of a plurality of respective forward gear levels of a gear shift selector of the vehicle and one of a plurality of incline grades of the vehicle;
   receiving, by an electronic controller, a signal indicating a forward gear level of the gear shift selector;
   receiving, by the electronic controller, an inclination signal indicating an incline grade of the vehicle;
   identifying, by the electronic controller, a requested vehicle target speed of the plurality of target speeds that corresponds to the forward gear level of the gear shift selector and the incline grade of the vehicle; and
   generating, by the electronic controller, at least one of an engine torque request and a brake torque request to control the vehicle speed to equal the requested vehicle target speed,
   wherein the electronic controller identifies the requested vehicle target speed independent of any operating conditions of the engine.

10. The method of controlling vehicle speed according to claim 8, further comprising outputting, by the electronic controller, a signal corresponding to the engine torque request to the engine of the vehicle to request the engine to increase engine torque.

11. The method of controlling vehicle speed according to claim 8, further comprising outputting, by the electronic controller, a signal corresponding to the brake torque request to a braking system of the vehicle to request the braking system to increase brake pressure.

12. The method of controlling vehicle speed according to claim 8, further comprising receiving, by the electronic controller, a signal indicative of a relative position of at least one of an accelerator pedal and a brake pedal of the vehicle.

13. The method of controlling vehicle speed according to claim 12, further comprising generating, by the electronic controller, a second engine torque request based on the relative position of the accelerator pedal to operate the vehicle at a driver input speed.

14. The method of controlling vehicle speed according to claim 13, further comprising operating the vehicle at the requested vehicle target speed once the accelerator position returns to an original position.

15. The method of controlling vehicle speed according to claim 12, further comprising generating, by the electronic controller, a second brake torque request based on the relative position of the brake pedal.

16. The method of controlling vehicle speed according to claim 15, further comprising operating the vehicle at the requested vehicle target speed once the brake position returns to an original position.

* * * * *